J. C. WOODCOCK.
FEED GRINDER.
APPLICATION FILED MAY 11, 1915.

1,209,790.

Patented Dec. 26, 1916.
3 SHEETS—SHEET 1.

WITNESSES
Jno H Wells.
R. E. Taylor.

INVENTOR
John C. Woodcock.
BY
Frank P. Shepard.
ATTORNEY

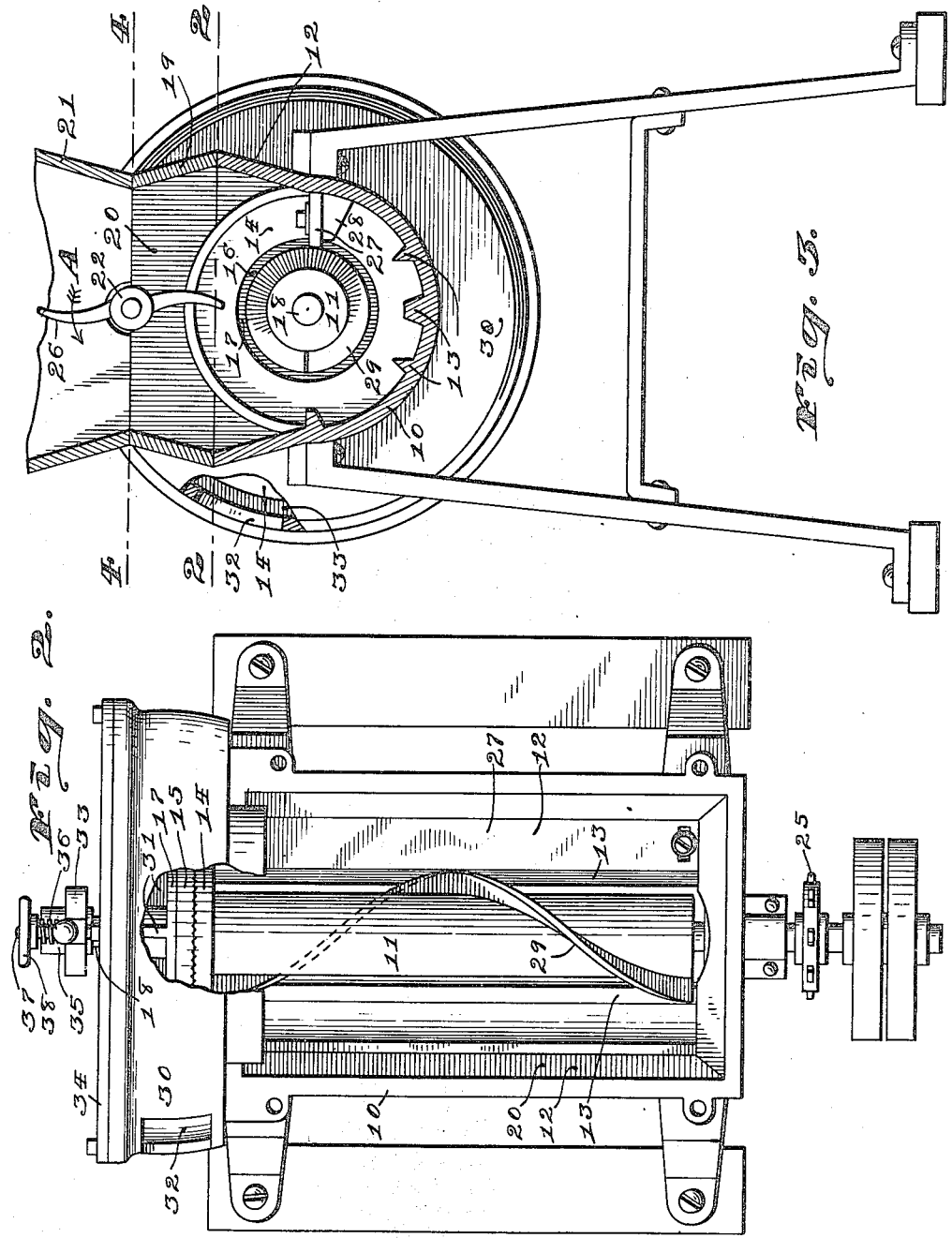

J. C. WOODCOCK.
FEED GRINDER.
APPLICATION FILED MAY 11, 1915.

1,209,790.

Patented Dec. 26, 1916.
3 SHEETS—SHEET 3.

WITNESSES:
Jos. H. Wells.
R. E. Taylor.

INVENTOR
John C. Woodcock.
BY
Frank P. Shepard.
ATTORNEY

UNITED STATES PATENT OFFICE.

JOHN C. WOODCOCK, OF OKLAHOMA, OKLAHOMA.

FEED-GRINDER.

1,209,790.
Specification of Letters Patent.
Patented Dec. 26, 1916.

Application filed May 11, 1915. Serial No. 27,435.

*To all whom it may concern:*

Be it known that I, JOHN C. WOODCOCK, a citizen of the United States, residing at Oklahoma city, in the county of Oklahoma and State of Oklahoma, have invented certain new and useful Improvements in Feed-Grinders, of which the following is a specification, reference being had to the accompanying drawings.

This invention pertains to machines for grinding feed, such as ear corn, shelled corn, alfalfa hay, and various kinds of cereals in the head into suitable feed for stock.

On the 22 day of November, 1910, Letters Patent No. 976,535 were granted to me for improvements in feed mills, and the present invention is in the nature of an improvement on the machine shown in said Letters Patent.

In the machine shown in the above patent, a conveyer box, semicircular in cross-section, is provided and contains a rotary spiral conveyer, a hopper being provided on the conveyer box to receive the material to be ground. A pair of grinding plates is mounted at one end of the box and axially coincident with the conveyer, these plates being arranged to receive and grind the material forcibly fed to them by the conveyer.

One objection to the machine is that in grinding cereals in the head, or other bulky material, the material cannot be fed forcibly and tightly enough into the conveyer box around the conveyer to have the latter properly engage and feed it to the grinding plates.

An object, therefore, of the present invention is to overcome the above objection.

Another object is to provide improved means for more forcibly ejecting the ground material from the grinding plates.

Other objects and advantages of the invention will be set forth in the ensuing description.

The accompanying drawings show one embodiment of the invention in practical form.

Figure 1:
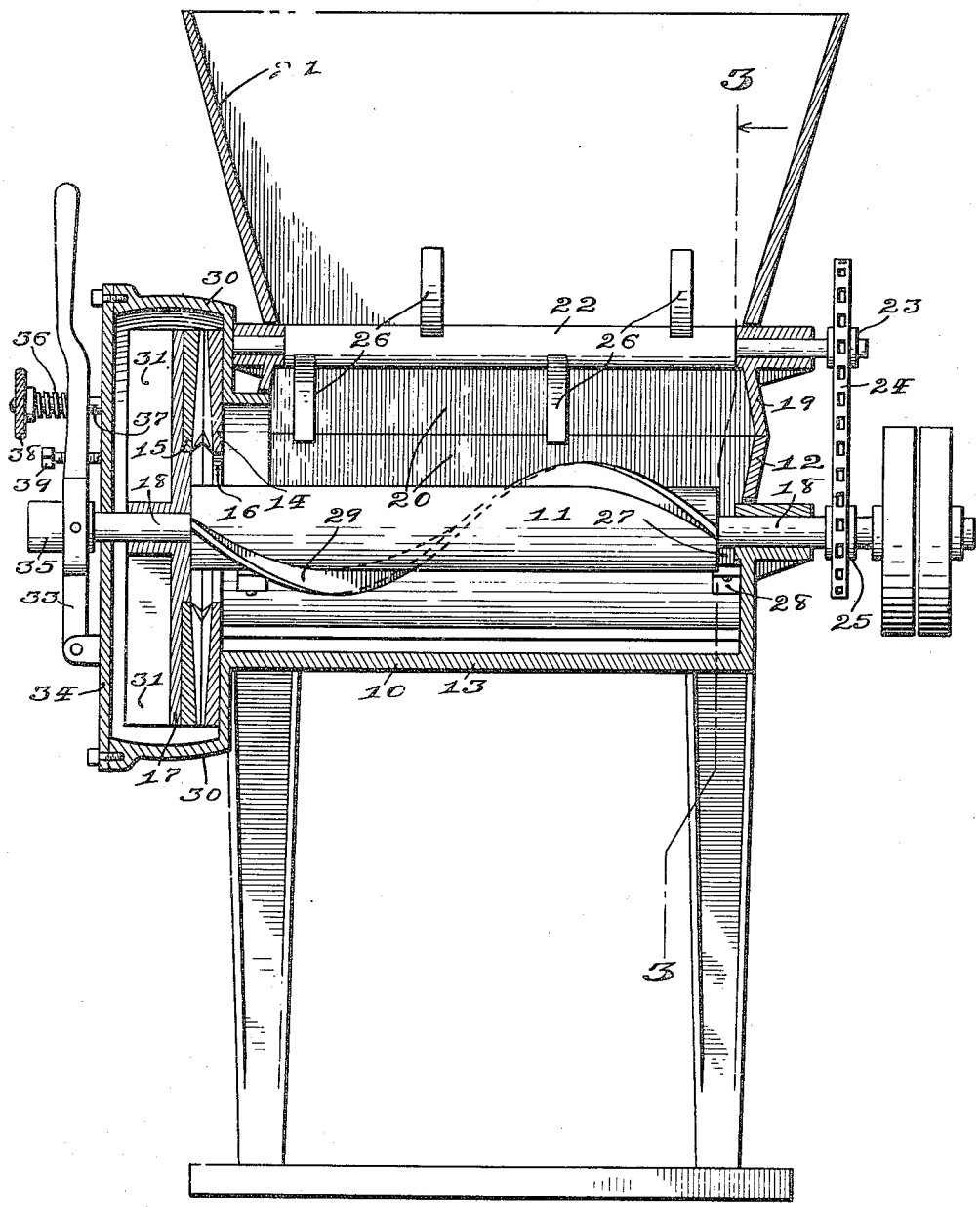
Figure 4:
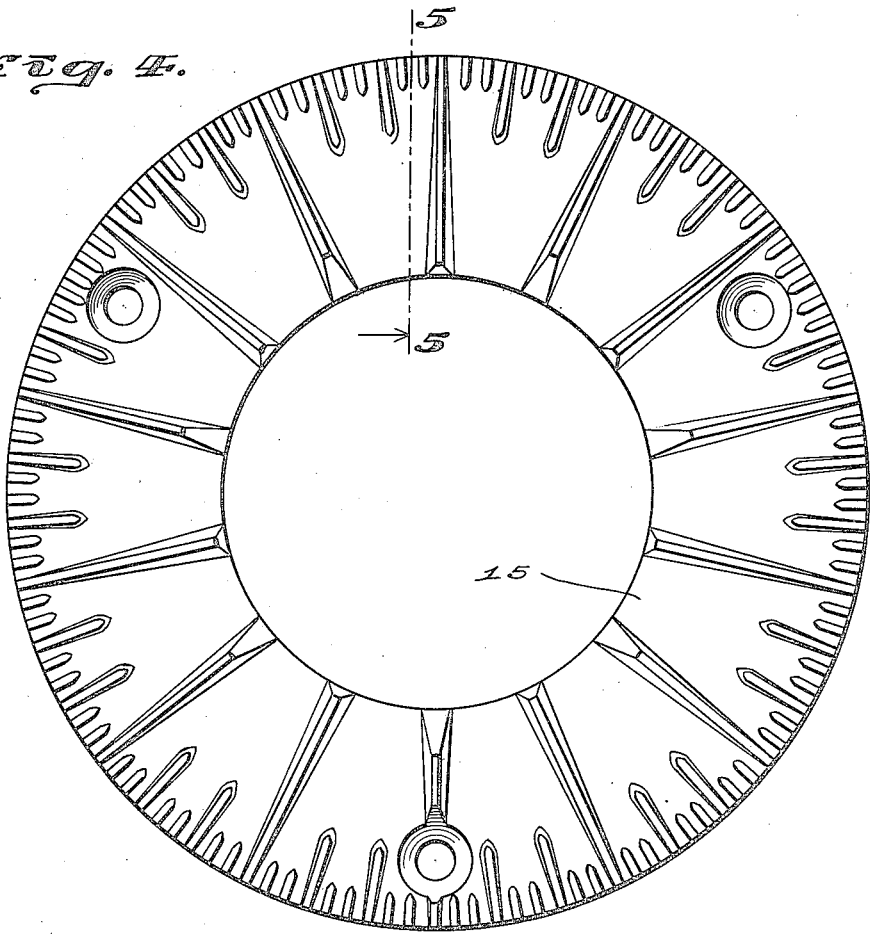
Figure 5:
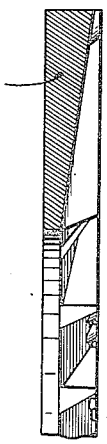

Figure 1 is a sectional view of the improved machine taken on a vertical plane which includes the axis lines of a certain rotatable conveyer and feed shaft. Fig. 2 is a plan view of the machine with parts above the line 2—2 of Fig. 3 removed. Fig. 3 is a sectional view taken on the line 3—3 of Fig. 1. Fig. 4 is an enlarged elevation view of a grinding plate taken in the direction of the view shown in Fig. 3. Fig. 5 is a sectional view taken on the line 5—5 of Fig. 4.

Referring to the several figures, in all of which like characters of reference designate like parts, the improved machine includes a conveyer box 10 and a rotatable conveyer 11 which is journaled in said box, all that part of the conveyer box below the conveyer being semicircular and axially coincident therewith while that portion above the conveyer and up to the line 2—2 of Fig. 3 is shaped as an integral flaring hopper 12.

The lower inner surface of the conveyer box 10 is provided with ribs 13 which act to prevent rotation of the material worked upon by the conveyer 11, these ribs being substantially parallel with the conveyer and designed to coöperate therewith in urging the material toward a pair of grinding plates 14 and 15 at the delivery end of the machine. The plate 14 is carried by the conveyer box 10 and has a central opening 16 through which the material is fed by the conveyer 11, the other plate 15 being bolted to a supporting disk 17 which is mounted tightly on the shaft 18 of the conveyer 11.

The parts thus described are not materially different from those shown in the above Letters Patent.

In carrying out the objects stated, a hopper extension 19 meets and rests upon the hopper portion 12 of the conveyer box 10, this extension being reduced in width at its top so that, taken with the hopper portion 12, it forms a compartment hereinafter referred to as an expanding chamber, in which the material that has been forcibly fed into its reduced upper end may again expand and be allowed to change position before being forced against and engaged by the conveyer 11. This expanding chamber 20 is provided with an upper and larger hopper 21 through which the material is fed to the machine.

At the top of the expanding chamber 20, which is the point of reduced width indicated by the line 4—4 of Fig. 3, a feed-shaft 22 is journaled in the upper hopper extension 19 parallel with the conveyer 11, this shaft having on its outer end a tight sprocket-wheel 23 which receives motion through a link belt 24 from a tight sprocket-wheel 25 on the shaft 18 of the conveyer 11. This feed shaft 22 is provided with a number of feeding arms 26 which receive the material fed into the upper hopper 21 and crowd said material down into the expanding chamber 20, these arms being backwardly curved so that during the revolving movement of said shaft in the direction indicated by the arrow A they wipe downward on the material and force it into the expanding chamber. By thus placing the feed shaft 22 at a reduced portion of the passage into the expanding chamber 20, the material drawn down from the hopper 21 past said shaft by the arms 26 is broken into better condition to be received and worked upon by the conveyer 11, and in passing from said feed shaft into the expanding chamber said material is allowed to loosen up and change position and be again more forcibly fed and packed in said chamber by the arms 26 to be received by the conveyer 11.

In addition to the ribs 13 in the conveyer box 10, a bar 27 is arranged in said box and bolted to supporting lugs 28 therein, this bar having sharp corners and co-acting with the lip 29 of the conveyer 11 as a shears to cut and break portions of the material which have not been previously reduced to condition to be fed to the grinding plates 14 and 15. The bar 27 may be adjusted with relation to the lip 29, and when its working corner becomes dull it may be turned over or end for end to bring a new corner into action. The conveyer 11 may also be removed from its shaft 18 and turned end for end when its lip 29 becomes dull, thereby bringing the other corner of said lip into action.

In order to throw the ground material from the casing 30 which incloses the plates 14 and 15, the rear face of the disk 17 which supports the rear plate 15 is provided with integral fan blades 31, thereby adapting the machine not only to deliver the ground feed downward, but also in an upward direction, such, for example, as through the delivery opening 32.

As best shown in Fig. 1, the plates 14 and 15 are yieldably held in grinding contact by a lever 33 which is fulcrumed to the rear wall 34 of the casing 30 below the conveyer shaft 18 and intermediately pivoted to a thrust bearing 35 which is slipped over the end of said shaft, the upper portion of the lever being held to its work by a coil spring 36 which is mounted on a stud bolt 37 set in said casing. This spring 36 is backed up by a hand nut 38 which is screwthreaded to the bolt 37 and may be adjusted to adjust the tension of said spring. A screw 39 in the lever 33 bears against the wall 34 of the casing 30, and may be adjusted to suitably limit the swing of the lever which brings the plates 14 and 15 together. By manually grasping the upper end of the lever 33, the grinding plates 14 and 15 may be drawn apart to release any foreign matter that might collect between them and fail to pass out.

Having thus described the invention, I claim:—

1. A feed grinding machine, including a horizontally disposed conveyer box having a semi-cylindrical bottom, a screw conveyer mounted within the semi-cylindrical bottom of the box, a hopper arranged over the conveyer box and terminating in a narrow discharge opening extending longitudinally of the conveyer, and an enlarged expanding chamber interposed between the hopper and the top of the spiral conveyer, the side walls of the enlarged expanding chamber being inclined upwardly and downwardly respectively toward the hopper and the semi-cylindrical bottom of the box from an intermediate point in the height thereof, the material being adapted to spread out within the expanding chamber after passing through the discharge opening of the hopper and before being acted upon by the conveyer.

2. A feed grinding machine, including a conveyer box formed with a substantially semi-cylindrical bottom and with upwardly diverging side walls, a screw conveyer mounted within the semi-cylindrical bottom of the box, a separate hopper section arranged over the conveyer box and provided in the bottom thereof with a narrow discharge opening extending longitudinally of the conveyer, and an independent intermediate section fitted between the bottom of the hopper and the top of the box, the side walls of the section converging upwardly toward the discharge opening of the hopper and coöperating with the upwardly diverging side walls of the box to provide an expanding chamber above the conveyer, the material being adapted to spread out within the expanding chamber after passing through the discharge opening of the hopper and before being acted upon by the conveyer.

Witness my hand this 27 day of April, 1915.

JOHN C. WOODCOCK.

Witnesses:
 MINTA DE FORD,
 R. S. NORRIS.